(12) United States Patent
Ueno et al.

(10) Patent No.: US 10,550,778 B2
(45) Date of Patent: Feb. 4, 2020

(54) CONTROL DEVICE FOR INTERNAL COMBUSTION ENGINE

(71) Applicant: Honda Motor Co., Ltd., Tokyo (JP)

(72) Inventors: Masaki Ueno, Saitama (JP); Noritaka Kimura, Saitama (JP); Kosuke Ihara, Saitama (JP); Yuto Katori, Saitama (JP); Yosuke Yamada, Saitama (JP); Hajime Uto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/976,876

(22) Filed: May 11, 2018

(65) Prior Publication Data

US 2018/0328297 A1    Nov. 15, 2018

(30) Foreign Application Priority Data

May 12, 2017   (JP) .................................. 2017-095401

(51) Int. Cl.
  *F02P 5/15*    (2006.01)
  *F02D 41/00*   (2006.01)
  (Continued)

(52) U.S. Cl.
  CPC ....... *F02D 41/0062* (2013.01); *F02D 35/025* (2013.01); *F02D 41/0072* (2013.01);
  (Continued)

(58) Field of Classification Search
  CPC .......... F02D 35/026; F02D 2041/0075; F02D 2200/022; F02D 2200/0418; F02P 5/15; F02P 5/1502; F02P 5/1516; F02P 5/152
  (Continued)

(56) References Cited

U.S. PATENT DOCUMENTS 6,062,204 A * 5/2000 Cullen ................. F02D 41/005
                                               123/406.12
7,715,976 B1 * 5/2010 Xiao ..................... F02M 26/46
                                               123/406.48
(Continued)

FOREIGN PATENT DOCUMENTS

JP    2004508488    3/2004
JP    2011001853    1/2011
(Continued)

OTHER PUBLICATIONS

Office Action of Japan Counterpart Application, with English translation thereof, dated Nov. 20, 2018, pp. 1-14.
(Continued)

*Primary Examiner* — Erick R Solis
(74) *Attorney, Agent, or Firm* — JCIPRNET

(57) ABSTRACT

Provided is a control device for an internal combustion engine, which can ensure a stable combustion state of the internal combustion engine even under a high-humidity environment condition, thereby improving the merchantability. The control device for the internal combustion engine includes an ECU (electronic control unit). The ECU calculates a basic target EGR amount according to an operating state of the internal combustion engine, calculates a water vapor amount in air drawn into an intake passage of the internal combustion engine, calculates an EGR conversion amount by using the water vapor amount, calculates a target EGR amount by subtracting the EGR conversion amount from the basic target EGR amount, and controls internal EGR and external EGR of the internal combustion engine by using the target EGR amount.

6 Claims, 9 Drawing Sheets

(51) Int. Cl.
    *F02M 26/47*     (2016.01)
    *F02M 26/01*     (2016.01)
    *F02D 35/02*     (2006.01)
    *F02P 5/152*     (2006.01)
    *F02D 13/02*     (2006.01)

(52) U.S. Cl.
    CPC ............ *F02M 26/01* (2016.02); *F02M 26/47* (2016.02); *F02D 13/0265* (2013.01); *F02D 2041/0075* (2013.01); *F02D 2200/0418* (2013.01); *F02P 5/152* (2013.01)

(58) Field of Classification Search
    USPC .......................... 123/406.48, 406.49, 406.68
    See application file for complete search history.

(56) References Cited

U.S. PATENT DOCUMENTS

| | | | | |
|---|---|---|---|---|
| 9,920,699 | B1* | 3/2018 | McQuillen | F02D 19/084 |
| 9,970,348 | B2* | 5/2018 | Hagner | F02D 41/0072 |
| 2004/0163624 | A1* | 8/2004 | Meyer | F02D 41/064 |
| | | | | 123/406.47 |
| 2005/0066659 | A1* | 3/2005 | Super | F02B 29/0493 |
| | | | | 60/605.2 |
| 2014/0222318 | A1* | 8/2014 | Ramappan | F02D 41/0072 |
| | | | | 701/108 |
| 2015/0083081 | A1* | 3/2015 | Surnilla | F02M 26/08 |
| | | | | 123/406.48 |
| 2015/0240730 | A1* | 8/2015 | Styles | F02D 41/144 |
| | | | | 123/393 |
| 2015/0337745 | A1* | 11/2015 | MacNeille | F02D 37/02 |
| | | | | 123/406.48 |

FOREIGN PATENT DOCUMENTS

| | | |
|---|---|---|
| JP | 2017057801 | 3/2017 |
| WO | 2016017214 | 2/2016 |

OTHER PUBLICATIONS

"Office Action of Japan Counterpart Application", dated Apr. 16, 2019, with English translation thereof, p. 1-p. 6.

* cited by examiner

CONTROL DEVICE FOR INTERNAL COMBUSTION ENGINE

CROSS-REFERENCE TO RELATED APPLICATION

This application claims the priority benefit of Japan application serial no. 2017-095401, filed on May 12, 2017. The entirety of the above-mentioned patent application is hereby incorporated by reference herein and made a part of this specification.

BACKGROUND

Technical Field

The disclosure relates to a control device for an internal combustion engine, which uses a water vapor parameter to control operation of the internal combustion engine, and the water vapor parameter represents the ratio or amount of water vapor in the air drawn into an intake passage.

Related Art

As a control device for an internal combustion engine, the applicant has previously proposed a control device as set forth in WO2016/017214 (Patent Document 1). The control device calculates the EGR (exhaust gas recirculation) ratio REGRT by the calculation processing shown in FIG. 4 of the document. In the case of the calculation processing, first, an ideal in-cylinder gas amount Gth is calculated by the calculation processing shown in FIG. 5 of the document, and a reference in-cylinder gas temperature Tcylstd is calculated by searching a map according to the engine speed NE or the like; next, an in-cylinder gas temperature Tcyl is calculated by the calculation processing shown in FIG. 6 of the document (step 1 to step 3). Then, an in-cylinder gas amount Gact is calculated by using formula (9), and finally the EGR ratio REGRT is calculated by using formula (12) (step 4 to step 5).

Further, in the ignition timing control processing shown in FIG. 7 of the document, an optimum ignition timing IGMBT is calculated according to the engine speed NE and the EGR ratio REGRT, and a final ignition timing IGLOG is calculated by using the optimum ignition timing IGMBT (step 31 to step 36). Then, a gas mixture is ignited using a spark plug at a timing corresponding to the ignition timing IGLOG.

Generally speaking, in an internal combustion engine, the air drawn from the atmosphere (hereinafter referred to as "intake air") is used to generate the gas mixture, and the intake air may be in a high-humidity state in rainy weather. In this case, the water vapor in the intake air has the following characteristics: the water vapor can reduce the combustion temperature of the gas mixture like the recirculated gas does, and the water vapor has a higher capability than the recirculated gas in reducing the combustion temperature.

However, when the control device of Patent Document 1 calculates the EGR ratio, the humidity state of the intake air is not taken into consideration. Therefore, under a high-humidity environment condition, for example, the intake air in the high-humidity state may lead to an unduly low combustion temperature and an unstable combustion state, and thus surging or misfiring may occur. Further, for the same reason, the ignition timing may be controlled unduly toward the retarded side, resulting in poor fuel economy performance.

SUMMARY

The disclosure provides a control device for an internal combustion engine, which can ensure a stable combustion state of the internal combustion engine even under a high-humidity environment condition, thereby improving the merchantability.

According to an embodiment of the disclosure, a control device for an internal combustion engine is provided, including: an intake air amount parameter acquiring part acquiring an intake air amount parameter representing an amount of intake air, the intake air being air drawn into an intake passage of the internal combustion engine; a water vapor parameter acquiring part acquiring a water vapor parameter representing a ratio or amount of water vapor in the intake air; a dry intake air parameter calculation part calculating a dry intake air parameter by using the intake air amount parameter and the water vapor parameter, the dry intake air parameter representing a ratio or an amount of dry intake air obtained by excluding the water vapor from the intake air; and a combustion timing control part controlling a combustion timing of a gas mixture of the internal combustion engine by using the dry intake air parameter.

The control device for the internal combustion engine acquires the intake air amount parameter representing the amount of the intake air, i.e., the air drawn into the intake passage of the internal combustion engine, acquires the water vapor parameter representing the ratio or amount of water vapor in the intake air, and calculates the dry intake air parameter representing the ratio or amount of dry intake air obtained by excluding the water vapor from the intake air by using the intake air amount parameter and the water vapor parameter. Therefore, the dry intake air parameter can be calculated as a value representing the ratio or amount of the air excluding the function of reducing the combustion temperature, that is, the same function as the recirculated gas caused by the water vapor in the intake air. Therefore, the control precision of the combustion timing can be increased by using the dry intake air parameter to control the combustion timing of the gas mixture of the internal combustion engine. Hence, the above problem that the combustion timing, i.e., the ignition timing, is unduly controlled toward the retarded side can be avoided, thereby improving the fuel economy performance (the "acquiring" in "acquiring the intake air amount parameter" and "acquiring the water vapor parameter" in this specification is not limited to direct detection of the parameters by using a sensor, but also comprises calculation of their values by using other parameters).

According to an embodiment, in the control device for the internal combustion engine, the combustion timing control part calculates a dry intake air amount, which is the amount of the dry intake air, as the dry intake air parameter, calculates a water vapor amount, which is the amount of the water vapor, as the water vapor parameter, calculates an in-cylinder gas temperature, which is a gas temperature inside a cylinder, by using the dry intake air amount and the water vapor amount, and controls the combustion timing by using the in-cylinder gas temperature.

According to the control device for the internal combustion engine, because the gas temperature inside the cylinder, i.e., the in-cylinder gas temperature, is calculated by using the dry intake air amount and the water vapor amount, the in-cylinder gas temperature can be calculated as a temperature that takes into consideration the function of the water vapor, which is the same as the recirculated gas, so that high calculation precision can be ensured. Therefore, high control precision for the control of the combustion timing can be ensured by using the in-cylinder gas temperature to control the combustion timing. Hence, good fuel economy performance can be ensured.

According to an embodiment, in the control device for the internal combustion engine, the combustion timing control part calculates a total EGR (exhaust gas recirculation) ratio representing a ratio of EGR in a total in-cylinder gas by using the dry intake air parameter and the water vapor parameter, and controls the combustion timing by using the total EGR ratio.

According to the control device for the internal combustion engine, because the total EGR ratio representing the ratio of EGR in the total in-cylinder gas is calculated by using the dry intake air parameter and the water vapor parameter, the total EGR ratio is calculated as a ratio of gas that takes into consideration both the recirculated gas and the water vapor that has the same function as the recirculated gas. Therefore, high control precision for the control of the combustion timing can be ensured by using the total EGR ratio to control the combustion timing. Hence, good fuel economy performance can be ensured.

According to an embodiment, in the control device for the internal combustion engine, the combustion timing control part calculates the dry intake air amount, which is the amount of the dry intake air, as the dry intake air parameter, calculates the water vapor amount, which is the amount of the water vapor, as the water vapor parameter, calculates, by multiplying the water vapor amount by a conversion factor greater than 1, an EGR conversion amount obtained by converting the water vapor amount into an EGR amount, and calculates the total EGR ratio by using the dry intake air amount and the EGR conversion amount.

According to the control device for the internal combustion engine, the EGR conversion amount obtained by converting the water vapor amount into an EGR amount is calculated by multiplying the water vapor amount by the conversion factor greater than 1, and the total EGR ratio representing the ratio of EGR in the total in-cylinder gas is calculated by using the dry intake air amount and the EGR conversion amount. As described above, the water vapor in the intake air has a characteristic of reducing the combustion temperature to a larger degree than the recirculated gas does, and therefore, the EGR conversion amount can be calculated as a value obtained by converting such a characteristic of the water vapor into an EGR amount. Therefore, the control precision for the control of the combustion timing can further be increased by using the total EGR ratio calculated by using the EGR conversion amount to control the combustion timing. Hence, the fuel economy performance can further be improved.

According to an embodiment of the disclosure, a control device for an internal combustion engine is provided, including: a basic target EGR amount calculation part calculating, according to an operating state of the internal combustion engine, a basic target EGR amount that is a basis of a target value of an EGR amount, the EGR amount being an amount that causes an exhaust gas inside an exhaust passage of the internal combustion engine to recirculate to an intake side of the internal combustion engine; a water vapor parameter acquiring part acquiring a water vapor parameter representing a ratio or an amount of water vapor in intake air, the intake air being air drawn into an intake passage of the internal combustion engine; a water vapor amount calculation part calculating a water vapor amount, which is the amount of the water vapor, by using the water vapor parameter; an EGR conversion amount calculation part calculating, by multiplying the water vapor amount by a conversion factor greater than 1, an EGR conversion amount obtained by converting the water vapor amount into an EGR amount; a target EGR amount calculation part calculating a target EGR amount by correcting the basic target EGR amount by the EGR conversion amount; and a control part controlling operation of the internal combustion engine by using the target EGR amount.

The control device for the internal combustion engine calculates the basic target EGR amount according to the operating state of the internal combustion engine, and corrects the basic target EGR amount by using a correction value to calculate the target EGR amount. The correction value is calculated as a value obtained by calculating a water vapor amount using the water vapor parameter and converting the water vapor amount into an EGR amount by multiplying the water vapor amount by the conversion factor greater than 1, wherein the water vapor parameter represents the ratio or amount of water vapor in air drawn into the intake passage of the internal combustion engine, i.e., intake air. Therefore, the correction value is calculated as a value reflecting the water vapor amount in the intake air. In addition, the target EGR amount is calculated by using the correction value to correct the basic target EGR amount, and therefore, the target EGR amount is calculated as a value that takes into consideration the function of the water vapor in the intake air, which is the same as the recirculated gas, i.e., the function of reducing the combustion temperature. Therefore, by using the target EGR amount to control the operation of the internal combustion engine, a stable combustion state of the internal combustion engine can be ensured even under a high-humidity environment condition, thereby improving the merchantability.

Further, when various control processes are executed by using the target EGR amount that does not take the function of reducing the combustion temperature of the water vapor into consideration, as in Patent Document 1, to improve the control precision of the various control processes, various control processes need to be executed by using a correction processing or map search method corresponding to the water vapor, which may result in an increase in the operating load or the number of control steps. In view of this, in the control device for the internal combustion engine of the disclosure, the target EGR amount can be calculated as a value reflecting the function of reducing the combustion temperature of the water vapor in the intake air, so that the above-mentioned increase in the operating load or the number of control steps can be avoided, thereby further improving the merchantability.

According to an embodiment, in the control device for the internal combustion engine, the conversion factor is set to a value including 1.3 or close to 1.3.

As described below, the applicant found through experiments that the capability of the water vapor is about 1.3 times higher than the recirculated gas in retarding the combustion speed of the gas mixture. Therefore, in the control device for the internal combustion engine, the conversion factor is set to a value including 1.3 or close to 1.3, so that the capability of the water vapor in retarding the combustion speed of the gas mixture can be properly reflected, the EGR conversion amount can be calculated, and the calculation precision can be improved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
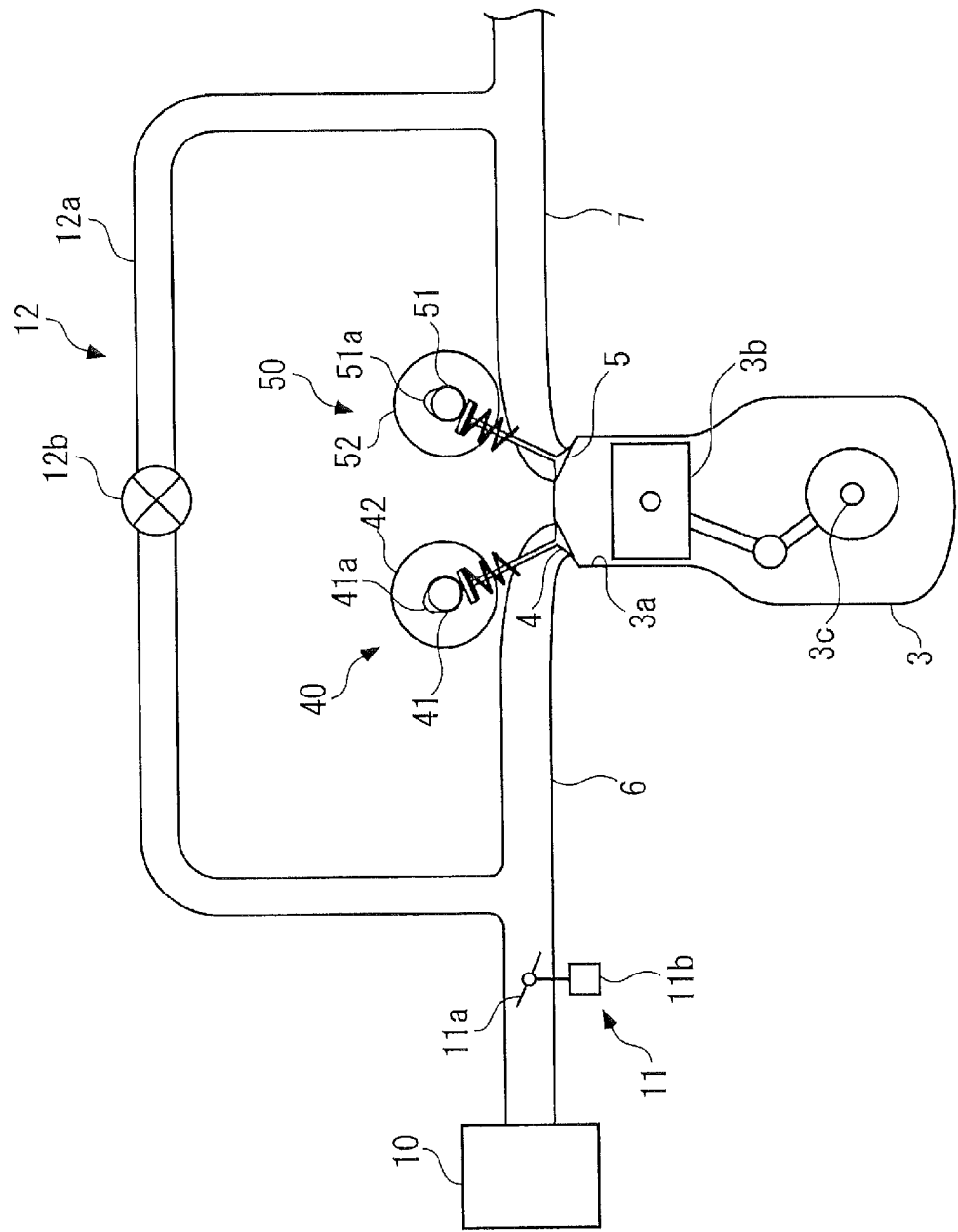
FIG. 1 is a diagram schematically illustrating the configuration of a control device according to an embodiment of the disclosure and an internal combustion engine using the control device.
Figure 2:
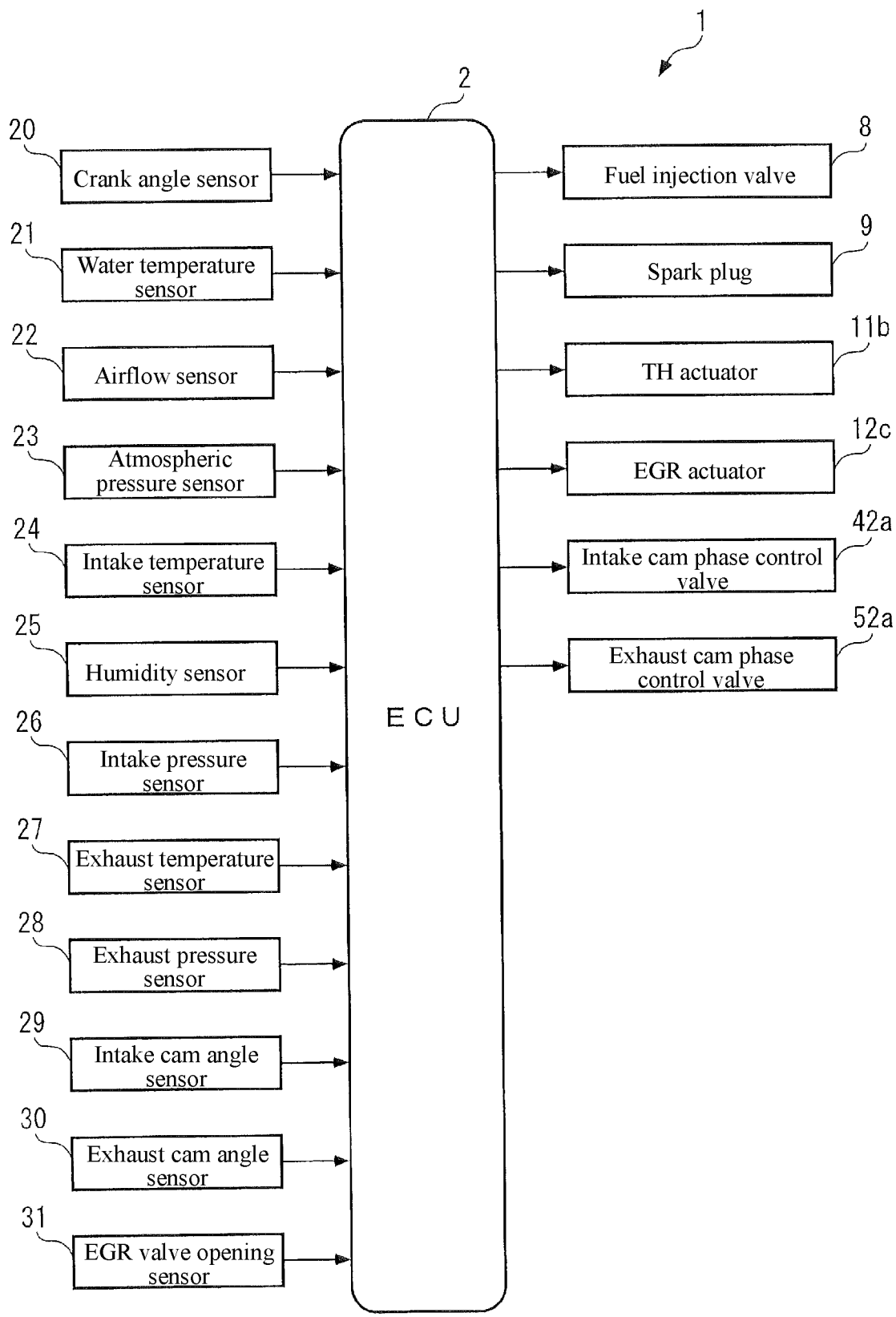
FIG. 2 is a block diagram of electrical configuration of the control device.

A control device for an internal combustion engine according to an embodiment of the disclosure is described below with reference to the accompanying drawings. As shown in FIG. 2, the control device 1 includes an ECU (electronic control unit) 2. As described below, the ECU 2 executes various control processing such as EGR control processing according to an operating state of the internal combustion engine (hereinafter referred to as "engine") 3 shown in FIG. 1.

The engine 3 is a straight four-cylinder gasoline engine including four pairs of cylinders 3a and pistons 3b (only one pair is shown), and is mounted as a power source on a vehicle (not shown). Further, the engine 3 includes intake valves 4 (only one is shown) provided for the cylinders 3a, exhaust valves 5 (only one is shown) provided for the cylinders 3a, an intake valve lift mechanism 40 for driving the intake valves 4 to be opened or closed, an exhaust valve lift mechanism 50 for driving the exhaust valves 5 to be opened or closed, and so on.

The intake valve lift mechanism 40 includes an intake cam shaft 41 for driving the intake valves 4 by using intake cams 41a, a variable intake cam phase mechanism 42, and the like. The variable intake cam phase mechanism 42 is configured to steplessly (i.e., continuously) change the relative phase of the intake cams 41a, i.e., the intake cam shaft 41, with respect to a crankshaft 3c (hereinafter referred to as "intake cam phase") CAIN toward an advanced side or a retarded side, so as to change valve timing of the intake valves 4. The variable intake cam phase mechanism 42 is arranged at an end portion on an intake sprocket (not shown) side of the intake cam shaft 41.

The variable intake cam phase mechanism 42 is hydraulic, and specifically has the same structure as that set forth in Japanese Laid-open Patent Application No. 5007-400522 filed by the applicant, so the details are omitted. However, the variable intake cam phase mechanism 42 includes an intake cam phase control valve 42a (referring to FIG. 2), a hydraulic circuit (not shown), and the like.

Figure 3:
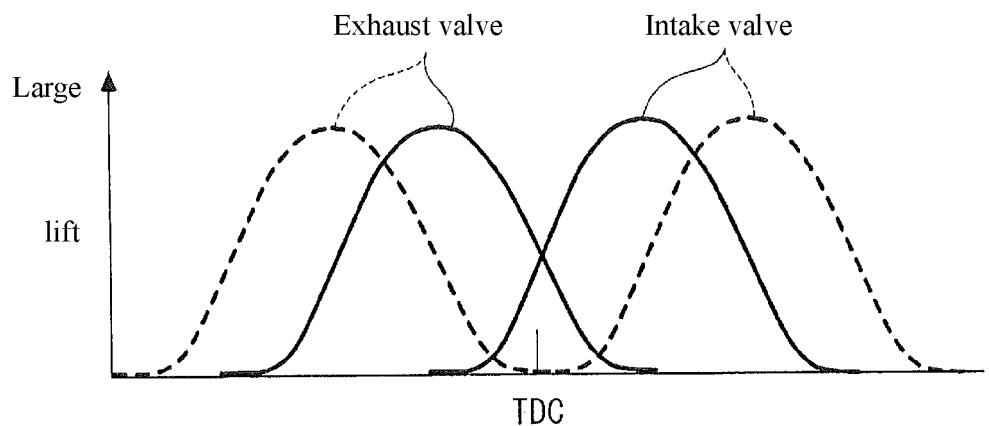
FIG. 3 is a diagram illustrating a valve lift curve of an intake valve when an intake cam phase is set to a most advanced value (solid line) and an origin value (dashed line) by a variable intake cam phase mechanism, and a valve lift curve of an exhaust valve when an exhaust cam phase is set to a most retarded value (solid line) and an origin value (dashed line) by a variable exhaust cam phase mechanism.

In the variable intake cam phase mechanism 42, the intake cam phase control valve 42a is controlled by using the ECU 2, to control hydraulic pressure supplied from the hydraulic circuit to an advanced chamber and a retarded chamber of the variable intake cam phase mechanism 42. Therefore, the intake cam phase CAIN is changed between a particular origin value CAIN_0 and a particular most advanced value CAIN_ADV, so that the valve timing of the intake valves 4 is steplessly changed between origin timing indicated by a dashed line in FIG. 3 and a most advanced timing indicated by a solid line in FIG. 3.

In this case, the origin value CAIN_0 is set to 0, and the most advanced value CAIN_ADV is set to a particular positive value. Therefore, as the intake cam phase CAIN increases from the origin value CAIN_0, the valve timing of the intake valves 4 becomes more advanced from the origin timing. Therefore, the valve overlap duration between the intake valves 4 and the exhaust valves 5 becomes longer. Hence, the internal EGR amount becomes larger.

Further, the exhaust valve lift mechanism 50 includes an exhaust cam shaft 51 for driving the exhaust valves 5 by using exhaust cams 51a, a variable exhaust cam phase mechanism 52, and the like. The variable exhaust cam phase mechanism 52 is configured to steplessly (i.e., continuously) change the relative phase of the exhaust cams 51a, i.e., the exhaust cam shaft 51, with respect to the crankshaft 3c (hereinafter referred to as "exhaust cam phase") CAEX toward the advanced side or the retarded side, so as to change valve timing of the exhaust valves 5. The variable exhaust cam phase mechanism 52 is arranged at an end portion on an exhaust sprocket (not shown) side of the exhaust cam shaft 51.

The variable exhaust cam phase mechanism 52 is a hydraulically driven mechanism that has the same structure as the above-mentioned variable intake cam phase mechanism 42, and includes an exhaust cam phase control valve 52a (referring to FIG. 2), a hydraulic circuit (not shown), and the like.

In the variable exhaust cam phase mechanism 52, the exhaust cam phase control valve 52a is controlled by using the ECU 2, to control hydraulic pressure supplied from the hydraulic circuit to an advanced chamber and a retarded chamber of the variable exhaust cam phase mechanism 52. Therefore, the exhaust cam phase CAEX is changed between a particular origin value CAEX_0 and a particular most advanced value CAEX_RET, so that the valve timing of the exhaust valves 5 is steplessly changed between origin timing indicated by a dashed line in FIG. 3 and a most advanced timing indicated by a solid line in FIG. 3.

In this case, the origin value CAEX_0 is set to 0, and the most retarded value CAEX_RET is set to a particular positive value. Therefore, as the exhaust cam phase CAEX increases from the origin value CAEX_0, the valve timing of the exhaust valves 5 becomes more advanced from the origin timing. Therefore, the valve overlap duration becomes longer. Hence, the internal EGR amount becomes larger.

Further, in the engine 3, fuel injection valves 8 and spark plugs 9 shown in FIG. 2 (only one is shown for each of the two) are provided for the cylinders 3a. The fuel injection valve 8 is mounted in a cylinder head to directly inject fuel into the cylinder 3a and is electrically connected to the ECU 2, and the fuel injection amount and the injection timing of the fuel injection valve 8 are controlled by the ECU 2.

Furthermore, the spark plugs 9 are mounted in the cylinder head of the engine 3 and are electrically connected to the ECU 2, and as described below, the ignition timing of the spark plug 9 is controlled by the ECU 2.

On the other hand, on the intake passage 6, an air cleaner 10 and a throttle valve mechanism 11 are provided in sequence from the upstream side. The air cleaner 10 is arranged at an air intake port of the intake passage 6, and includes a built-in filter (not shown). During operation of the engine 3, dir in air drawn into the intake passage 6 (hereinafter referred to as "intake air") is removed by the filter of the air cleaner 10.

Further, the throttle valve mechanism 11 includes a throttle valve 11a, a TH actuator 11b for driving the throttle valve 11a to be opened or closed, and the like. The throttle valve 11a can be freely rotatably arranged on the intake passage 6, and changes the opening degree by rotation to change the air flow flowing through the throttle valve 11a.

The TH actuator 11b is formed by assembling a gear mechanism (not shown) on a motor connected to the ECU 2, and is controlled by the ECU 2 to change the opening degree of the throttle valve 11a.

Further, the engine 3 is provided with an EGR device 12. The EGR device 12 causes part of the exhaust gas in the exhaust passage 7 to recirculate into the intake passage 6, and includes an EGR passage 12a, an EGR valve 12b, an EGR actuator 12c (referring to FIG. 2), and the like. The EGR passage 12a has one end connected to a particular position on the intake passage 6 that is closer to the downstream side than the throttle valve 11a, and another end connected to a particular position on the exhaust passage 7.

On the other hand, the EGR valve 12b is a butterfly valve, connected to the EGR actuator 12c. The EGR actuator 12c includes a DC motor and the like. In the EGR device 12, a control input signal from the ECU 2 is supplied to the EGR actuator 12c to control the opening degree of the EGR valve 12b, so as to control the amount of the exhaust gas recirculating from the exhaust passage 7 into the intake passage 6, i.e., the external EGR amount.

Further, in the following description, internal EGR and external EGR are collectively referred to as "EGR", and the sum of the internal EGR amount and the external EGR amount is referred to as the "EGR amount".

Further, as shown in FIG. 2, the ECU 2 is electrically connected to a crank angle sensor 20, a water temperature sensor 21, an airflow sensor 22, an atmospheric pressure sensor 23, an intake temperature sensor 24, a humidity sensor 25, an intake pressure sensor 26, an exhaust temperature sensor 27, an exhaust pressure sensor 28, an intake cam angle sensor 29, an exhaust cam angle sensor 30 and an EGR valve opening sensor 31.

The crank angle sensor 20 outputs a CRK signal and a TDC signal, which are both pulse signals, to the ECU 2 along with rotation of the crankshaft 3c. Each pulse of the CRK signal is delivered whenever the crankshaft rotates through a predetermined crank angle (for example, 30°). The ECU 2 calculates a rotational speed of the engine 3 (hereinafter referred to as the "engine speed") NE based on the CRK signal. Further, the TDC signal indicates that the piston 3b in each cylinder 3a is in a predetermined crank angle position slightly before the top dead center position at the start of an intake stroke, and is output whenever the crankshaft rotates through a particular crank angle.

Further, the water temperature sensor 21 is configured to detect a temperature of cooling water circulated in a cylinder block of the engine 3, i.e., an engine water temperature TW, and output a detection signal representing the engine water temperature TW to the ECU 2.

Further, the four sensors 22 to 25 are all arranged in the air cleaner 10. The airflow sensor 22 is configured to detect the amount of air flowing into the intake passage 6 through the air cleaner 10, and output a detection signal representing the air amount to the ECU 2. The ECU 2 calculates, based on the detection signal of the airflow sensor 22, the amount of air flowing into one cylinder within one combustion cycle, i.e., an intake air amount Gaircyl (the intake air amount parameter).

Further, the atmospheric pressure sensor 23 is configured to detect an atmospheric pressure PA, and output a detection signal representing the atmospheric pressure PA to the ECU 2. The intake temperature sensor 24 is configured to detect a temperature of air flowing into the intake passage 6 through the air cleaner 10, i.e., an intake temperature TA, and output a detection signal representing the intake temperature TA to the ECU 2. The humidity sensor 25 is configured to detect a relative humidity RH of air flowing into the intake passage 6 through the air cleaner 10, and output a detection signal representing the relative humidity RH to the ECU 2.

Further, the intake pressure sensor 26 is arranged in the intake passage 6 at a location downstream of a flow merging portion of the EGR passage 12a, and is configured to detect a gas pressure in the intake passage 6, i.e., an intake pressure PB, and output a detection signal representing the intake pressure PB to the ECU 2.

On the other hand, the exhaust temperature sensor 27 is configured to detect a temperature of the exhaust gas flowing in the exhaust passage 7, i.e., an exhaust temperature Tex, and output a detection signal representing the exhaust temperature Tex to the ECU 2. The exhaust pressure sensor 28 is configured to detect a gas pressure in the exhaust passage 7, i.e., an exhaust pressure Pex, and output a detection signal representing the exhaust pressure Pex to the ECU 2.

Further, the intake cam angle sensor 29 is arranged on an end portion of the intake cam shaft 41 opposite to the variable intake cam phase mechanism 42, and is configured to output an intake CAM signal, which is a pulse signal, to the ECU 2 along with rotation of the intake cam shaft 41, whenever the camshaft rotates through a predetermined cam angle (e.g. 10°). The ECU 2 calculates an intake cam phase CAIN based on the intake CAM signal and the above-mentioned CRK signal.

Further, the exhaust cam angle sensor 30 is arranged on an end portion of the exhaust cam shaft 51 opposite to the variable exhaust cam phase mechanism 52, and is configured to output an exhaust CAM signal, which is a pulse signal, to the ECU 2 along with rotation of the exhaust cam shaft 51, whenever the camshaft rotates through a predetermined cam angle (e.g. 10°). The ECU 2 calculates an exhaust cam phase CAEX based on the exhaust CAM signal and the above-mentioned CRK signal.

Further, the EGR valve opening sensor 31 is configured to detect the opening degree of the EGR valve 12b, i.e., an EGR valve opening degree $\phi$EGR, and output a detection signal representing the EGR valve opening degree $\phi$EGR to the ECU 2.

Further, the ECU 2 is formed by a microcomputer including a CPU, a RAM, a ROM, an I/O interface (not shown) and the like, and executes EGR control processing and the like in the following manner based on the detection signals of the above-mentioned sensors 20 to 31.

In this embodiment, the ECU 2 is equivalent to an intake air amount parameter acquiring part, a water vapor parameter acquiring part, a dry intake air parameter calculation part, a combustion timing control part, a basic target EGR amount calculation part, a water vapor amount calculation part, an EGR conversion amount calculation part, a target EGR amount calculation part and a control part.

Figure 4:
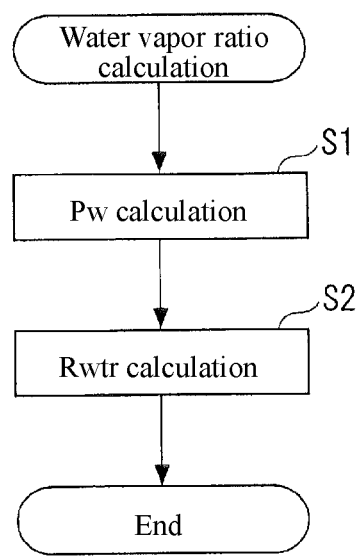
FIG. 4 is a flowchart of water vapor ratio calculation processing.

Then, water vapor ratio calculation processing is described with reference to FIG. 4. The calculation processing for calculating the ratio of the water vapor in the intake air, i.e., the water vapor ratio Rwtr, is executed by the ECU 2 by using a particular control period ΔT (for example, 10 ms).

As shown in the figure, first, in step 1 (abbreviated as "S1" in the figure and hereinafter), a water vapor pressure Pw is calculated by using the following formula (1).

[mathematical formula 1]

$$Pw = \exp\left[-\left(\frac{5087.06}{273.15+TA}\right)+18.251\right] \cdot RH \quad (1)$$

Then, in step 2, a water vapor ratio Rwtr is calculated by using the following formula (2), and then the processing ends.

[mathematical formula 2]

$$Pwtr = \frac{Pw}{PA} \quad (2)$$

Then, EGR control processing is described with reference to FIG. 5. In the EGR control processing, the EGR device 12 is used to control the external EGR amount, and the variable intake cam phase mechanism 42 and the variable exhaust cam phase mechanism 52 are used to control the internal EGR amount. The EGR control processing is executed by the ECU 2 by using the above-mentioned control period ΔT.

Figure 5:
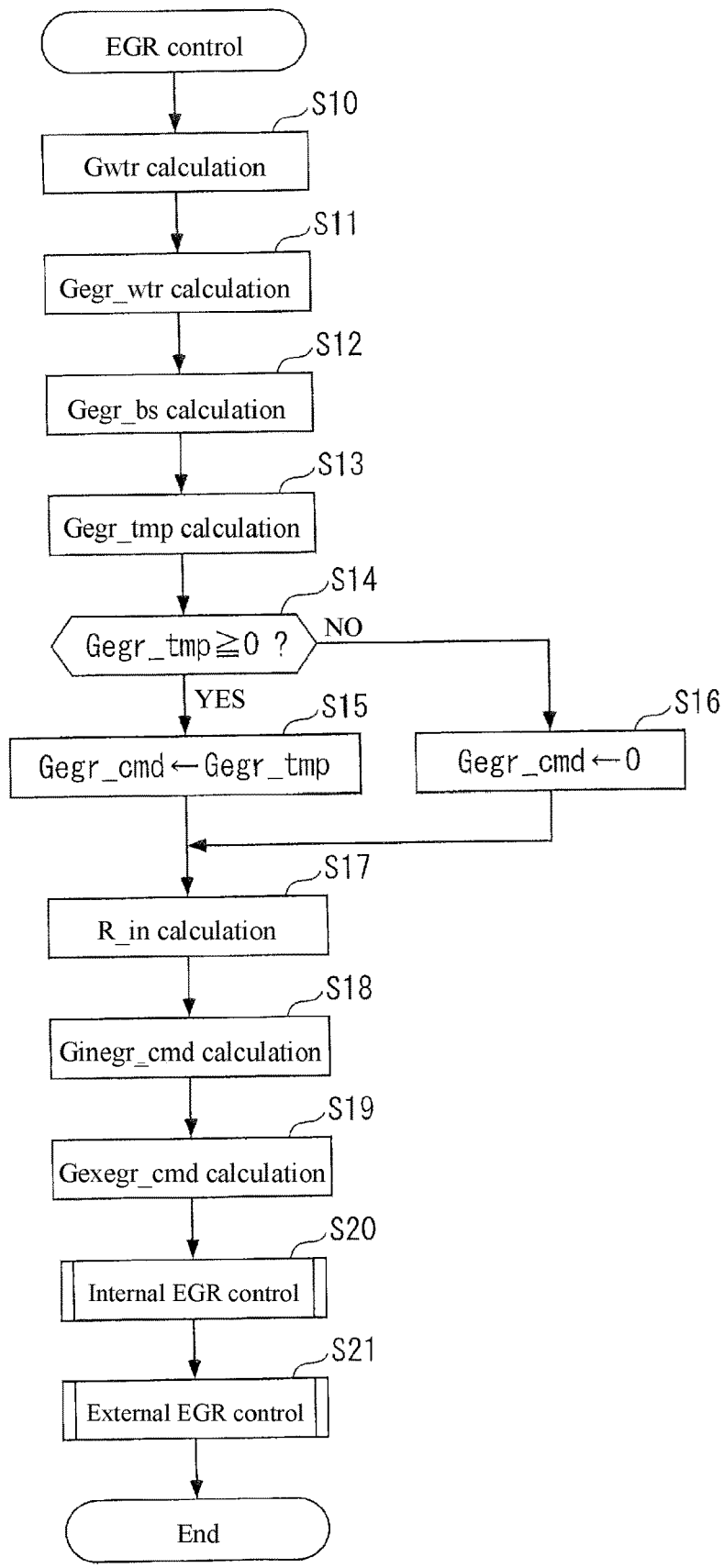
FIG. 5 is a flowchart of EGR control processing.

As shown in FIG. 5, first, in step 10, a water vapor amount Gwtr is calculated by using the following formula (3). The water vapor amount Gwtr (the water vapor parameter) is equivalent to the water vapor amount in the intake air.

[mathematical formula 3]

$$Gwtr = Gaircyl \cdot Rwtr \quad (3)$$

Then, in step 11, an EGR conversion amount Gegr_wtr is calculated by using the following formula (4). The EGR conversion amount Gegr_wtr is a value obtained by converting the water vapor amount Gwtr into an EGR amount by considering the water vapor as a recirculated gas.

[mathematical formula 4]

$$Gegr\_wtr = Gwtr \cdot Rwtr2egr \quad (4)$$

Figure 6:
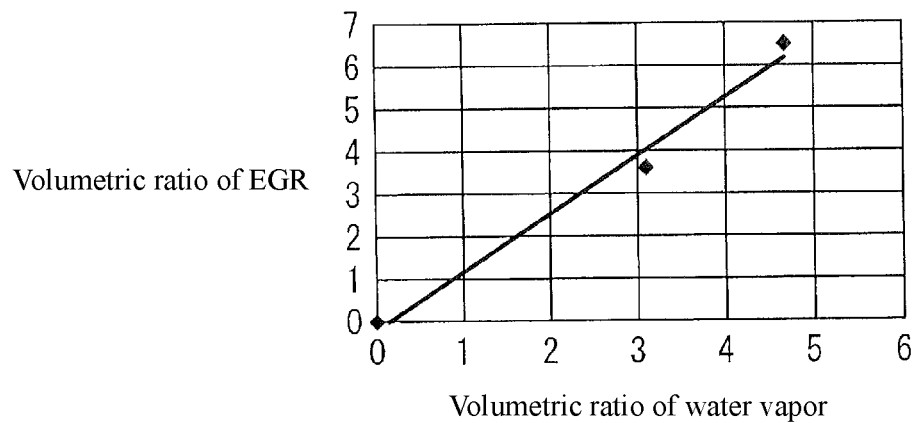
FIG. 6 is a diagram illustrating a relationship between influence of water vapor and a recirculated gas on the combustion temperature by using their volumetric ratios.

Rwtr2egr in formula (4) represents an EGR conversion factor for converting the water vapor amount Gwtr into an EGR amount. In this embodiment, the EGR conversion factor Rwtr2egr is set to 1.3. The reason is as follows: Specific heat of the water vapor is greater than specific heat of the recirculated gas. Therefore, when influence of water vapor and the recirculated gas on the combustion temperature is represented by using their volumetric ratios, as shown in FIG. 6, the volumetric ratio being 3% of the water vapor approximates the volumetric ratio being 4% of the recirculated gas. That is, the capability of the water vapor in retarding the combustion speed of the gas mixture is about 1.3 times higher than the recirculated gas. Therefore, to reflect such a relationship, the EGR conversion factor Rwtr2egr is set to 1.3.

Figure 7:
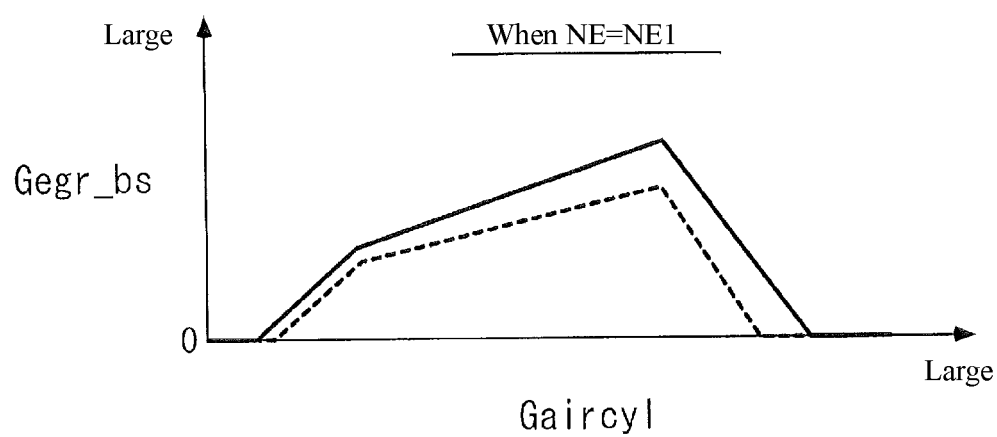
FIG. 7 is a diagram of an example of a map for calculating a basic target EGR amount.

Then, in step 12, a basic target EGR amount Gegr_bs is calculated by searching a map according to the intake air amount Gaircyl and the engine speed NE. In this case, a calculation map of the basic target EGR amount Gegr_bs when the engine speed NE is a particular rotational speed NE1 is as shown in FIG. 7.

In step 13 after step 12, a temporary target EGR amount Gegr_tmp is calculated by using the following formula (5).

[mathematical formula 5]

$$Gegr\_tmp = Gegr\_bs - Gegr\_wtr \quad (5)$$

Then, in step 14, it is determined whether the temporary target EGR amount Gegr_tmp is equal to or greater than 0. When the determination result is YES, i.e., Gegr_tmp≥0, in step 15, the target EGR amount Gegr_cmd is set to the temporary target EGR amount Gegr_tmp.

On the other hand, when the determination result of step 14 is NO, i.e., Gegr_tmp<0, in step 16, the target EGR amount Gegr_cmd is set to 0.

As described above, the temporary target EGR amount Gegr_tmp is calculated by subtracting the water vapor amount Gwtr from the basic target EGR amount Gegr_bs, and the target EGR amount Gegr_cmd is calculated by performing lower limit processing on the temporary target EGR amount Gegr_tmp by using 0 as a lower limit value. Hence, the target EGR amount Gegr_cmd is calculated as, for example, a value indicated by a dashed line in FIG. 7.

In step 17 after step 15 or step 16, an internal EGR ratio R_in is calculated. The internal EGR ratio R_in specifies the ratio of the target internal EGR amount in the target EGR amount Gegr_cmd, and is calculated by searching a map (not shown) according to the engine speed NE and engine load (for example, the intake air amount Gaircyl).

Then, in step 18, a target internal EGR amount Ginegr_cmd is calculated by using the following formula (6). The target internal EGR amount Ginegr_cmd is a value that becomes a target of the internal EGR amount Ginegr.

[mathematical formula 6]

$$Ginegr\_cmd = Gegr\_cmd \cdot R\_in \quad (6)$$

Then, in step 19, a target external EGR amount Gexegr_cmd is calculated by using the following formula (7). The target external EGR amount Gexegr_cmd is a value that becomes a target of the external EGR amount Gexegr.

[mathematical formula 7]

$$Gexegr\_cmd = Gegr\_cmd - Ginegr\_cmd \quad (7)$$

In step 20 after step 19, internal EGR control processing is executed. Specifically, first, a target intake cam phase CAIN_cmd and a target exhaust cam phase CAEX_cmd are calculated by searching a map (not shown) according to the target internal EGR amount Ginegr_cmd and the engine speed NE.

Then, control input signals corresponding to the target intake cam phase CAIN_cmd and the target exhaust cam phase CAEX_cmd are respectively supplied to the intake cam phase control valve 42a and the exhaust cam phase control valve 52a. Therefore, control can be implemented in a manner in which the intake cam phase CAIN becomes the target intake cam phase CAIN_cmd and the exhaust cam phase CAEX becomes the target exhaust cam phase CAEX_cmd. Hence, control can be implemented in a manner in which the internal EGR amount Ginegr becomes the target internal EGR amount Ginegr_cmd.

After the internal EGR control processing is executed in the above manner in step 20, in step 21, external EGR control processing is executed. Specifically, a control input signal corresponding to the target external EGR amount Gexegr_cmd is supplied to the EGR actuator 12c. Therefore, the EGR valve opening degree ϕEGR is controlled in a manner in which the actual external EGR amount Gexegr becomes the target external EGR amount Gexegr_cmd. In step 21, after the external EGR control processing is executed in the above manner, the processing ends.

Then, total EGR ratio calculation processing is described with reference to FIG. 8. The calculation processing calculates the total EGR ratio Regr_t is calculated in the following manner, and is executed by the ECU 2 by using the above-mentioned control period ΔT. The total EGR ratio Regr_t is equivalent to the EGR ratio when the water vapor is considered as the recirculated gas in addition to EGR (external EGR and internal EGR), i.e., the ratio of EGR in the total gas in the cylinder 3a. Further, the derivation principles of calculation algorithms for various parameters will be described below.

Figure 8:
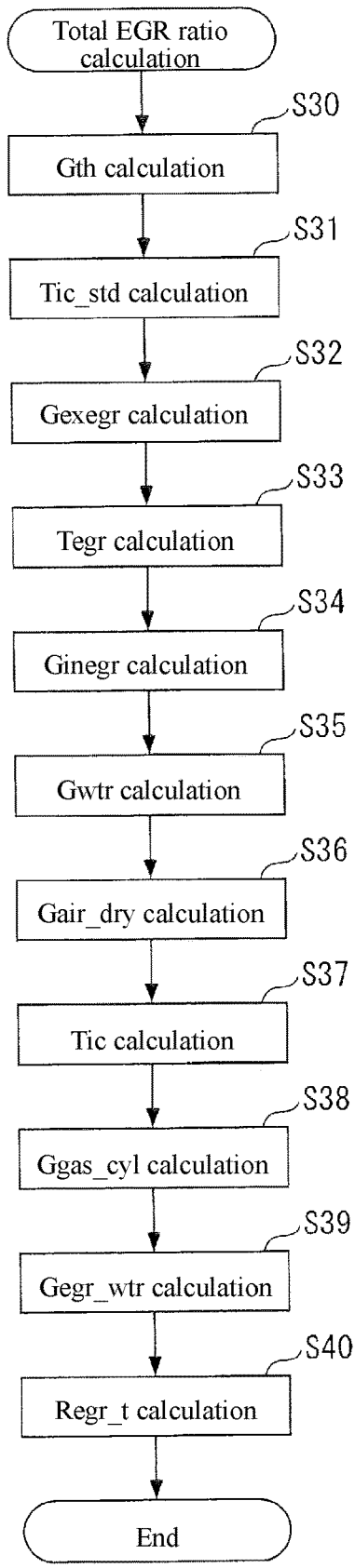
FIG. 8 is a flowchart of total EGR ratio calculation processing.

As shown in FIG. 8, first, in step 30, an ideal in-cylinder gas amount Gth is calculated by using the following formula (8).

[mathematical formula 8]

$$Gth = \frac{Gstdm \cdot KTW \cdot PB}{PBwot} \qquad (8)$$

Gstdm in formula (8) represents a map value of the reference in-cylinder gas amount, and is calculated by searching a map (not shown) according to the engine speed NE, the intake cam phase CAIN and the exhaust cam phase CAEX. Further, KTW in formula (8) represents a water temperature correction coefficient, and is calculated by searching a map (not shown) according to the engine water temperature TW. Further, PBwot in formula (8) represents a reference intake pressure, and is a particular value equivalent to the intake pressure PB when the throttle valve 11a is in a fully-open state.

Then, in step 31, a reference in-cylinder gas temperature Tic_std is calculated by searching a map (not shown) according to the engine speed NE, the intake cam phase CAIN and the exhaust cam phase CAEX.

Then, in step 32, an external EGR amount Gexegr is calculated. Specifically, the external EGR amount Gexegr is calculated based on EGR valve opening degree ϕEGR, the intake pressure PB and the exhaust pressure Pex, and by using a nozzle-related formula (not shown) derived by considering the EGR valve 12b as a nozzle.

In step 33 after step 32, an external EGR temperature Tegr is calculated. The external EGR temperature Tegr is specifically calculated in the following manner: calculating a reference external EGR temperature Tegr_bs by searching a map (not shown) according to the external EGR amount Gexegr and the engine speed NE, and correcting the reference external EGR temperature Tegr_bs according to the engine water temperature TW.

Then, in step 34, an internal EGR amount Ginegr is calculated by using the following formula (9).

[mathematical formula 9]

$$Ginegr = \frac{Gth \cdot Tic\_std - Gaircyl \cdot TA - Gexegr \cdot Tegr}{Tex} \qquad (9)$$

Then, in step 35, the water vapor amount Gwtr is calculated by using the above-mentioned formula (3).

In step 36 after step 35, a dry intake air amount Gair_dry is calculated by using the following formula (10). The dry intake air amount Gair_dry (the dry intake air parameter) is equivalent to the amount of dry air obtained by excluding the water vapor from the intake air.

[mathematical formula 10]

$$Gair\_dry = Gaircyl \cdot (1 - Rwtr) \qquad (10)$$

Then, in step 37, an in-cylinder gas temperature Tic is calculated by using the following formula (11).

[mathematical formula 11]

$$Tic = \frac{Gair\_dry \cdot TA + Gwr \cdot TA + Ginegr \cdot Tex + Gexegr \cdot Tegr}{Gair\_dry + Gwtr + Ginegr + Gexegr} \qquad (11)$$

Then, in step 38, an in-cylinder gas amount Ggas_cyl is calculated by using the following formula (12).

[mathematical formula 12]

$$Ggas\_cyl = \frac{Gth \cdot Tic\_std}{Tic} \qquad (12)$$

In step 39 after step 38, an EGR conversion amount Gegr_wtr is calculated by using the above-mentioned formula (4).

Then, in step 40, a total EGR ratio Regr_t is calculated by using the following formula (13), and then the processing ends. The total EGR ratio Regr_t (the total EGR ratio) is equivalent to an EGR ratio calculated by considering the water vapor as EGR.

[mathematical formula 13]

$$Regr\_t = \frac{(Ggas\_cyl - Gair\_dry - Gwtr) + Gegr\_wtr}{Ggas\_cyl} \qquad (13)$$

Further, the value in the parenthesis of the numerator on the right side of the formula (13) is equivalent to the sum of the internal EGR amount and the external EGR amount.

Figure 9:
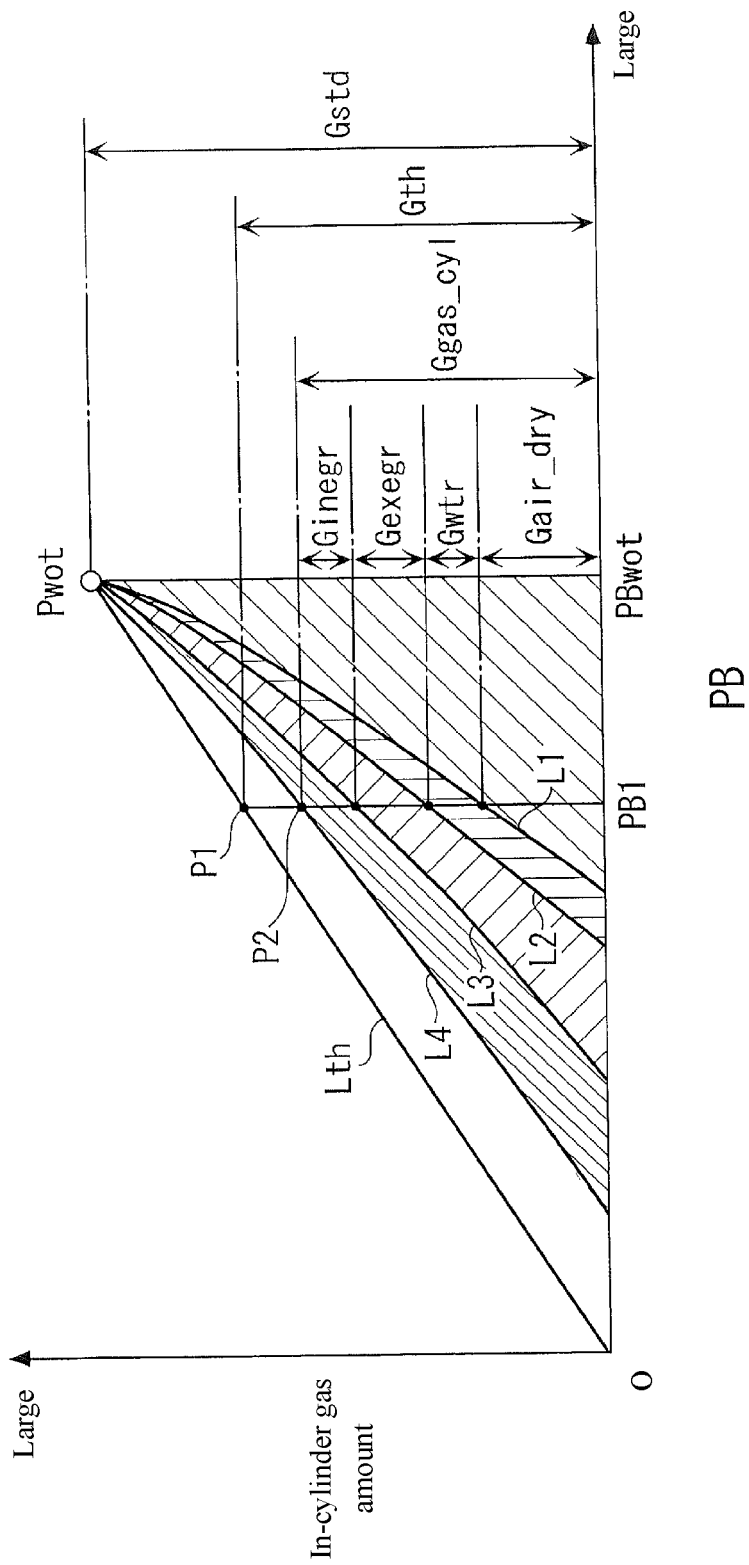
FIG. 9 is a diagram illustrating the derivation principles of calculation algorithms for calculating various parameters of a total EGR ratio.

Then, the derivation principles of the calculation algorithms used in the total EGR ratio calculation processing are described with reference to FIG. 9. FIG. 9 shows a relationship between the intake pressure PB and the in-cylinder gas amount when the engine speed NE, the intake cam phase CAIN and the exhaust cam phase CAEX are fixed particular values.

A reference point Pwot shown in FIG. 9 corresponds to a state in which the throttle valve 11a is fully opened (reference state). At the reference point Pwot, the throttle valve 11a is in the fully-open state, so that the intake pressure PB becomes equal to a reference intake pressure PBwot approximately equal to the atmospheric pressure PA. Further, since there is almost no pressure difference between the exhaust side and the intake side, there occurs no back-flow of exhaust gases from the exhaust side into the intake side even in a state in which the overlap of the intake valve and the exhaust valve occurs, so that the internal EGR amount due to blow-back from the intake side becomes approximately equal to 0.

Further, a line Lth connecting the reference point Pwot and an origin O (hereinafter referred to as the "ideal line Lth") represents the relationship between the intake pressure and the in-cylinder gases in an ideal state in which it is assumed that no exhaust gases are recirculated into the cylinder 3a, i.e., an ideal state in which it is assumed that the external EGR is not performed and there is no internal EGR. That is, in the above-mentioned reference state and ideal state, the in-cylinder gas temperature and a gas constant of the in-cylinder gases can be regarded as constant, and hence the ideal line Lth is derived from the equation of state of gas as a straight line.

Further, in FIG. 9, lines L1 to L4 represent the amounts of various gases of the actual in-cylinder gases. Specifically, the line L1 represents the dry intake air amount Gair_dry of the in-cylinder gases, the line L2 represents the sum of the dry intake air amount Gair_dry and the water vapor amount Gwtr of the in-cylinder gases, i.e., the intake air amount Gaircyl, the line L3 represents the sum of the dry intake air amount Gair_dry, the water vapor amount Gwtr and the external EGR amount Gexegr, and the line L4 represents the total in-cylinder gas amount Ggas_cyl, i.e., the sum of the dry intake air amount Gair_dry, the water vapor amount Gwtr, the external EGR amount Gexegr and the internal EGR amount Ginegr.

Here, a description will be given of the relationship between states on the ideal line Lth and the line L4, obtained when the intake pressure PB is equal to a particular intake pressure PB1 smaller than a reference intake pressure PBwot at the reference point Pwot.

First, as to the relationship between a state P1 on the ideal line Lth and a state P2 on the line L4, there holds the following formula (14) from the equation of state of gas.
[mathematical formula 14]

$$Gth \cdot Tic\_th = Ggas\_cyl \cdot Tic \quad (14)$$

Tic_th in formula (14) represents the in-cylinder gas temperature in the state P1 (the ideal in-cylinder gas temperature).

Further, in the state P2 on the line L4, there holds the following formula (15) from an equilibrium relationship in temperature in the cylinder 3a.
[mathematical formula 15]

$$Ggas\_cyl \cdot Tic = Gaircyl \cdot TA + Ginegr \cdot Tex + Gexegr \cdot Tegr \quad (15)$$

The following formula (16) can be obtained by deriving a formula for calculating the internal EGR amount Ginegr based on the above formula (14) and formula (15).

[mathematical formula 16]

$$Ginegr = \frac{Gth \cdot Tic\_th - Gaircyl \cdot TA - Gexegr \cdot Tegr}{Tex} \quad (16)$$

Here, as described above, the ideal in-cylinder gas temperature is fixed on the ideal line Lth. Therefore, if the ideal in-cylinder gas temperature Tic_th in formula (16) is substituted by the in-cylinder gas temperature at the reference point Pwot, i.e., the reference in-cylinder gas temperature Tic_std, formula (9) can be derived.

Further, formulas for calculating the reference in-cylinder gas temperature Tic_std and the reference in-cylinder gas amount Gstd are derived in the following manner. At the time of termination of an exhaust stroke of the engine 3, in a state in which the piston 3b has reached the top dead center position, part of burned gases remain in a combustion chamber formed between the piston 3b and the cylinder head without being discharged from the cylinder 3a. The remaining burned gases exist within the cylinder 3a together with the amount of intake air filled in the cylinder even in the reference state in which the throttle valve 11a is fully opened and the internal EGR amount and the like are approximately equal to 0.

The remaining burned gas amount Gegrd can be expressed using the equation of state of gas by the following formula (17).

[mathematical formula 17]

$$Gegrd = \frac{Pex \cdot Vd}{R \cdot Tex} \quad (17)$$

Vd in formula (17) represents the volume of the combustion chamber when the piston 3b has reached the top dead center position, and R represents a gas constant.

Further, the reference in-cylinder gas temperature Tic_std is calculated by using the following formula (18) according to a temperature balance relationship in the cylinder 3a in the reference state and the remaining burned gas amount Gegrd calculated in formula (17).

[mathematical formula 18]

$$Tic\_std = \frac{Gaircyl \cdot TA + Gegrd \cdot Tex}{Gaircyl + Gegrd} \quad (18)$$

Further, the reference in-cylinder gas amount Gstd is the sum of the intake air amount Gaircyl and the remaining burned gas amount Gegrd, and therefore can be expressed by the following formula (19).
[mathematical formula 19]

$$Gstd = Gaircyl + Gegrd \quad (19)$$

Therefore, according to the relationship between the reference point Pwot and the state P1 on the ideal line Lth, the ideal in-cylinder gas amount Gth in the state P1 is calculated by using the following formula (20) according to the intake pressure PBwot at the reference point Pwot, the intake pressure PB1 in the state P1 and the reference in-cylinder gas amount Gstd.

[mathematical formula 20]

$$Gth = \frac{Gstd \cdot PB1}{PBwot} \quad (20)$$

If in formula (20), the reference in-cylinder gas amount Gstd is substituted by the product Gstdm•KTW of the map value of the reference in-cylinder gas amount and the water temperature correction coefficient and the intake pressure PB1 in the state P1 is substituted by the intake pressure PB at the moment, the above-mentioned formula (8) can be derived as a formula for calculating the ideal in-cylinder gas amount Gth.

Further, in FIG. 9, the in-cylinder gas temperature in the state P2, i.e., the actual in-cylinder gas temperature Tic, is calculated by using the following formula (21) according to a temperature balance relationship in the cylinder 3a formed by the intake air, the internal EGR and the external EGR.

[mathematical formula 21]

$$Tic = \frac{Gaircyl \cdot TA + Ginegr \cdot Tex + Gexegr \cdot Tegr}{Gaircyl + Ginegr + Gexegr} \quad (21)$$

If Gaircyl=Gair_dry+Gwtr is substituted into formula (21), the above-mentioned formula (11) can be derived as a formula for calculating the in-cylinder gas temperature Tic.

Further, if the ideal in-cylinder gas temperature Tic_th in the above-mentioned formula (14) is substituted by the reference in-cylinder gas temperature Tic_std and the in-cylinder gas amount Ggas_cyl is fixed on the left side of the formula, the above-mentioned formula (12) can be derived as a formula for calculating the in-cylinder gas amount Ggas_cyl.

Then, ignition timing control processing is described with reference to FIG. 10. The ignition timing control processing calculates the ignition timing IGLOG as the combustion timing for each cylinder 3a, and is executed concurrently with the generation of the TDC signal. Further, the ignition timing IGLOG is calculated in the following manner: a crank angle at the TDC position of a compression stroke is set to 0. Being closer to the advanced side than the TDC position indicates a larger positive value. Further, ignition timing control processing methods for the four cylinders 3a are the same. Therefore, the following describes an ignition timing control processing method for one cylinder as an example.

Figure 10:
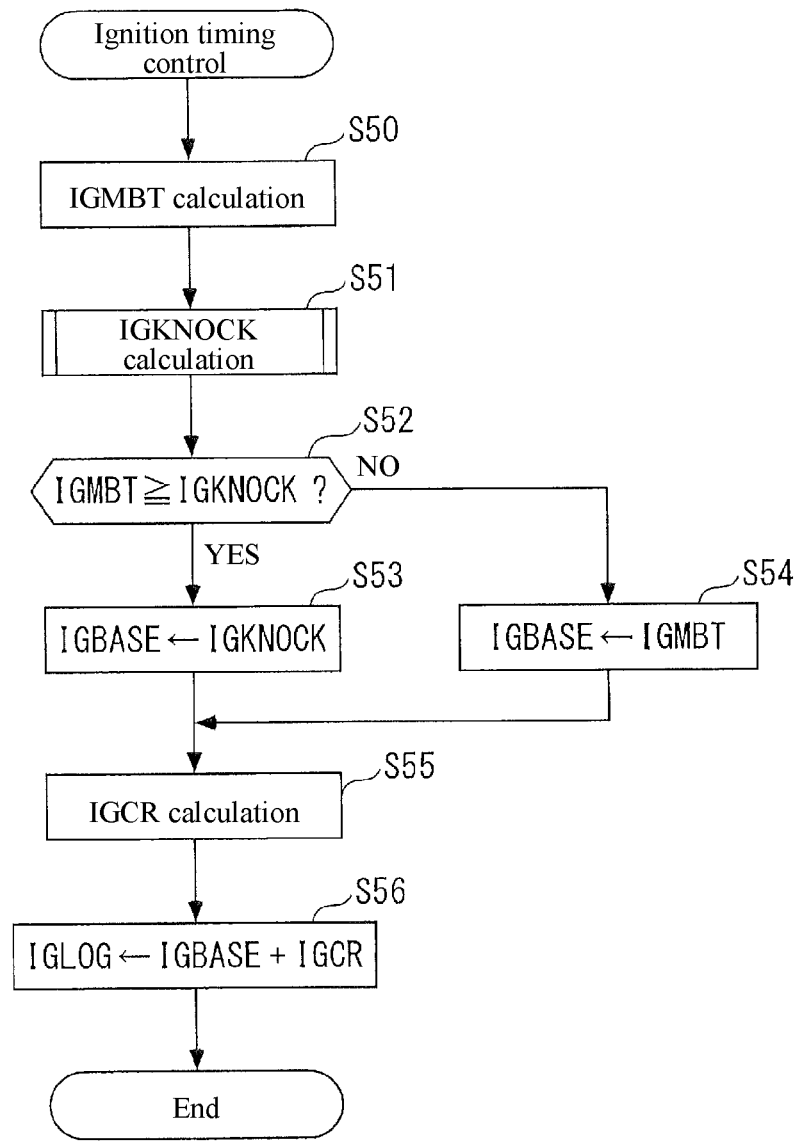
FIG. 10 is a flowchart of ignition timing control processing.

As shown in FIG. 10, first, in step 50, an optimum ignition timing IGMBT is calculated by searching a map (not shown) according to the engine speed NE and the total EGR ratio Regr_t. The optimum ignition timing IGMBT is equivalent to an ignition timing at MBT (Minimum advance for Best Torque). In the map, the optimum ignition timing IGMBT is set such that it becomes larger (more advanced) as the total EGR ratio Regr_t is larger.

Then, in step 51, a knocking limit ignition timing IGKNOCK is calculated. The knocking limit ignition timing IGKNOCK specifies a limit beyond which knocking occurs (i.e., a value of advance that can prevent occurrence of knocking). A specific method for calculating the knocking limit ignition timing is not shown here, but the knocking limit ignition timing can be calculated by using the same method as that in Patent Document 1.

Then, in step 52, it is determined whether the optimum ignition timing IGMBT is equal to or greater than the knocking limit ignition timing IGKNOCK. When the determination result is YES, i.e., the optimum ignition timing IGMBT is set to be equal to or more advanced than the knocking limit ignition timing IGKNOCK, to avoid occurrence of knocking, a basic ignition timing IGBASE is set to the knocking limit ignition timing IGKNOCK in step 53.

On the other hand, when the determination result of step 52 is NO, to ensure a maximum torque, the basic ignition timing IGBASE is set to the optimum ignition timing IGMBT in step 54.

In step 55 after step 53 or step 54, a correction value IGCR is calculated according to the engine water temperature TW and the like.

Then, in step 56, the ignition timing IGLOG is set to the sum IGBASE+IGCR of the basic ignition timing IGBASE and the correction value IGCR, and then the processing ends. As described above, when the ignition timing IGLOG is calculated, at a timing corresponding to the ignition timing IGLOG, the ECU 2 supplies a control input signal to the spark plug 9, and the spark plug 9 discharges. Therefore, the gas mixture is ignited.

Then, the effect of executing the ignition timing control processing of the disclosure under a high-humidity environment condition is described with reference to FIG. 11 and FIG. 12. In the two figures, data indicated by mesh lines corresponds to the use of the control method of the disclosure, and data indicated by dashed lines corresponds to the use of a conventional control method set forth in Patent Document 1.

Figure 11:
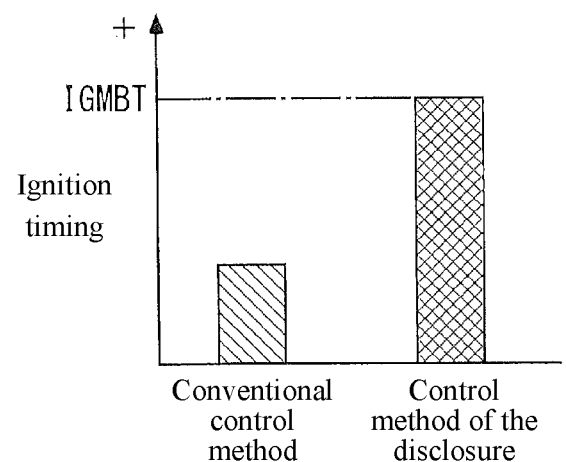
FIG. 11 is a diagram of an example of control results obtained by executing ignition timing control under a high-humidity environment condition by using the control method of the disclosure and a conventional control method.

As can be learned from FIG. 11, when the conventional control method is used, the ignition timing is controlled to be greatly retarded from the optimum ignition timing IGMBT due to a large amount of water vapor in the intake air. In contrast, when the control method of the disclosure is used, the optimum ignition timing IGMBT can be achieved by controlling the amount of advance of the ignition timing. Hence, good fuel economy performance can be ensured even under a high-humidity environment condition.

Figure 12:
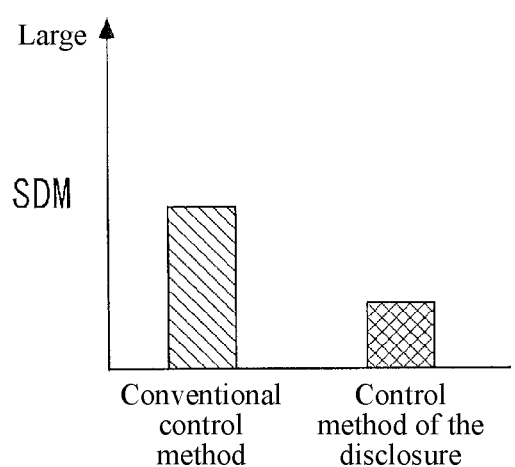
FIG. 12 is a diagram illustrating combustion instability when ignition timing control is executed under a high-humidity environment condition by using the control method of the disclosure and a conventional control method.

Further, in FIG. 12, a value SDM of the longitudinal axis is a parameter representing the combustion instability. A larger value SDM indicates more instable combustion. In other words, a smaller value SDM indicates higher combustion stability. As can be learned from FIG. 12, the control method of the disclosure improves the combustion stability as compared with the conventional control method. Hence, surging or misfiring can be prevented even under a high-humidity environment condition.

As described above, the control device 1 of this embodiment calculates the basic target EGR amount Gegr_bs according to the engine speed NE and the intake air amount Gaircyl, calculates the EGR conversion amount Gegr_wtr by multiplying the water vapor amount Gwtr by the EGR conversion factor Rwtr2egr, and calculates the target EGR amount Gegr_cmd by subtracting the EGR conversion amount Gegr_wtr from the basic target EGR amount Gegr_bs. In this case, the water vapor in the intake air has the same function as the recirculated gas, i.e., the function of reducing the combustion temperature. Therefore, the EGR conversion amount Gegr_wtr is calculated as a value obtained by converting the water vapor amount Gwtr of the water vapor having such a characteristic into an EGR amount. Therefore, the target EGR amount Gegr_cmd can be calculated as a value that properly considers the function of the water vapor in the intake air, which is the same as the recirculated gas.

Therefore, the combustion stability during execution of EGR control can be improved by using the target EGR amount Gegr_cmd to control the EGR device 12, the variable intake cam phase mechanism 42 and the variable exhaust cam phase mechanism 52. Further, as compared with Patent Document 1 in which various control processing is executed by using the target EGR amount that does not take into consideration the function of reducing the combustion temperature of the water vapor, the disclosure can reduce the operating load or the number of control steps, thereby further improving the merchantability.

Further, the water vapor in the intake air has a higher capability than the recirculated gas in reducing the combustion temperature, and the EGR conversion factor Rwtr2egr is set to 1.3 which can properly reflect such a relationship, so that the EGR conversion amount Gegr_wtr can be calculated as a value obtained by converting such a characteristic of the water vapor into an EGR amount. Therefore, the calculation precision can be improved.

Further, the dry intake air amount Gair_dry is calculated by subtracting the water vapor amount Gwtr from the intake air amount Gaircyl, and the total EGR ratio Regr_t is calculated by using the dry intake air amount Gair_dry, the water vapor amount Gwtr and the EGR conversion amount Gegr_wtr. Therefore, the total EGR ratio Regr_t can be calculated as a ratio of gas that takes into consideration the water vapor having the same function as the recirculated gas in addition to EGR (external EGR and internal EGR). Therefore, executing the ignition timing control by using the total EGR ratio Regr_t can ensure high control precision. Hence, the problem that the ignition timing is unduly controlled toward the retarded side can be avoided, thereby ensuring good fuel economy performance.

In addition, the in-cylinder gas temperature Tic is calculated by using the dry intake air amount Gair_dry and the water vapor amount Gwtr, the in-cylinder gas amount Ggas_cyl is calculated by using the in-cylinder gas temperature Tic, and the total EGR ratio Regr_t is calculated by using the in-cylinder gas amount Ggas_cyl. Therefore, the calculation precision of the total EGR ratio Regr_t can further be improved. Hence, high control precision can be ensured in the ignition timing control, and the fuel economy performance can further be improved.

The embodiment illustrates an example that the water vapor amount Gwtr is used as the water vapor parameter. However, the water vapor parameter of the disclosure is not limited thereto, and any parameter that can represent the ratio or amount of the water vapor in the air drawn into the intake passage can be used. For example, the water vapor ratio Rwtr can also be used as the water vapor parameter.

Further, the embodiment illustrates an example that the control part is configured to control the ignition timing IGLOG of the internal combustion engine 3 by using the target EGR amount Gegr_cmd. However, the control part of the disclosure is not limited thereto, as long as the operation of the internal combustion engine can be controlled by using the target EGR amount. For example, the control part may also be configured to execute air fuel ratio control or fuel injection control of the internal combustion engine 3 by using the target EGR amount Gegr_cmd.

Further, the embodiment illustrates an example that the intake air amount Gaircyl is used as the intake air amount parameter. However, the intake air amount parameter of the disclosure is not limited thereto, and any parameter that can represent the amount of air drawn into the intake passage of the internal combustion engine can be used. For example, the ratio of the current intake air amount to the intake air amount when the throttle valve 11a is in the fully-open state can also be used as the intake air amount parameter.

On the other hand, the embodiment illustrates an example that ignition timing control is executed in the internal combustion engine including spark plugs as combustion timing control. However, the combustion timing control of the disclosure is not limited thereto, as long as the combustion timing can be controlled. For example, it may also be configured as controlling the combustion timing of the gas mixture in a compression-ignition type internal combustion engine including no spark plug.

Further, the embodiment illustrates an example that the dry intake air amount Gair_dry is used as the dry intake air parameter. However, the dry intake air parameter of the disclosure is not limited thereto, and any parameter that can represent the ratio or amount of dry intake air obtained by excluding water vapor from the air drawn into the intake passage. For example, a value 1-Rwtr can also be used as the dry intake air parameter.

Further, the embodiment illustrates an example that the total EGR ratio Regr_t is used as the total EGR ratio. However, the total EGR ratio of the disclosure is not limited thereto, as long as the ratio of EGR in the total in-cylinder gas can be represented. For example, the reciprocal of the total EGR ratio Regr_t can also be used as the total EGR ratio.

On the other hand, this embodiment illustrates an example that the total EGR ratio Regr_t is calculated by using formula (13). Alternatively, in formula (13), the in-cylinder gas amount Ggas_cyl is substituted by an in-cylinder gas amount ratio ηc_thcl, the dry intake air amount Gair_dry is substituted by a dry air amount ratio ηcair_dry, the water vapor amount Gwtr is substituted by a water vapor amount ratio ηc_wtr, and the EGR conversion amount Gegr_wtr is substituted by an EGR conversion amount ratio ηcegr_wtr; the total EGR ratio Regr_t is calculated by using the formula after substitution. Further, the ratios ηc_thcl, ηcair_dry, ηc_wtr, and ηcegr_wtr are equivalent to the ratios of various gas amounts Ggas_cyl, Gair_dry, Gwtr, and Gegr_wtr with respect to the above-mentioned reference in-cylinder gas amount Gstd.

Further, the embodiment illustrates an example that 1.3 is used as the EGR conversion factor Rwtr2egr. However, the EGR conversion factor of the disclosure is not limited thereto, and a particular value greater than 1 or a value close to 1.3 (for example, 1.2 to 1.4) can also be used.

Further, in the embodiment, the exhaust temperature sensor 27 is used to detect the exhaust temperature Tex. Alternatively, the exhaust temperature Tex may be derived according to the operating state of the engine 3.

On the other hand, in the embodiment, the exhaust pressure sensor 28 is used to detect the exhaust pressure Pex. Alternatively, the exhaust pressure Pex may be derived according to the operating state of the engine 3.

Further, the embodiment illustrates an example that the control device of the disclosure is applied to an internal combustion engine for vehicles. However, the control device of the disclosure is not limited thereto, and can also be applied to internal combustion engines for ships or internal combustion engines for other industrial devices.

What is claimed is:

1. A control device for an internal combustion engine, comprising:
    an intake air amount parameter acquiring part acquiring an intake air amount parameter representing an amount of intake air, the intake air being air drawn into an intake passage of the internal combustion engine;
    a water vapor parameter acquiring part acquiring a water vapor parameter representing a ratio or an amount of water vapor in the intake air;
    a dry intake air parameter calculation part calculating a dry intake air parameter by using the intake air amount parameter and the water vapor parameter, the dry intake air parameter representing a ratio or an amount of dry intake air obtained by excluding the water vapor from the intake air; and
    a combustion timing control part controlling a combustion timing of a gas mixture of the internal combustion engine by using the dry intake air parameter,
    wherein the combustion timing control part calculates a dry intake air amount, which is the amount of the dry intake air, as the dry intake air parameter, calculates a water vapor amount, which is the amount of the water vapor, as the water vapor parameter, calculates an in-cylinder gas temperature, which is a gas temperature inside a cylinder, by using the dry intake air amount and the water vapor amount, and controls the combustion timing by using the in-cylinder gas temperature.

2. The control device for the internal combustion engine according to claim 1, wherein:

the combustion timing control part calculates a total EGR (exhaust gas recirculation) ratio representing a ratio of EGR in a total in-cylinder gas by using the dry intake air parameter and the water vapor parameter, and controls the combustion timing by using the total EGR ratio.

3. The control device for the internal combustion engine according to claim 2, wherein:

the combustion timing control part calculates the dry intake air amount, which is the amount of the dry intake air, as the dry intake air parameter, calculates the water vapor amount, which is the amount of the water vapor, as the water vapor parameter, calculates, by multiplying the water vapor amount by a conversion factor greater than 1, an EGR conversion amount obtained by converting the water vapor amount into an EGR amount, and calculates the total EGR ratio by using the dry intake air amount and the EGR conversion amount.

4. A control device for an internal combustion engine, comprising:

a basic target EGR amount calculation part calculating, according to an operating state of the internal combustion engine, a basic target EGR amount that is a basis of a target value of an EGR amount, the EGR amount being an amount that causes an exhaust gas inside an exhaust passage of the internal combustion engine to recirculate to an intake side of the internal combustion engine;

a water vapor parameter acquiring part acquiring a water vapor parameter representing a ratio or an amount of water vapor in intake air, the intake air being air drawn into an intake passage of the internal combustion engine;

a water vapor amount calculation part calculating a water vapor amount, which is the amount of the water vapor, by using the water vapor parameter;

an EGR conversion amount calculation part calculating, by multiplying the water vapor amount by a conversion factor greater than 1, an EGR conversion amount obtained by converting the water vapor amount into an EGR amount;

a target EGR amount calculation part calculating a target EGR amount by correcting the basic target EGR amount by the EGR conversion amount; and a control part controlling operation of the internal combustion engine by using the target EGR amount.

5. The control device for the internal combustion engine according to claim 3, wherein the conversion factor is set to a value from 1.2 to 1.4.

6. The control device for the internal combustion engine according to claim 4, wherein the conversion factor is set to a value from 1.2 to 1.4.

* * * * *